Patented May 26, 1936

2,041,871

UNITED STATES PATENT OFFICE 2,041,871

SULPHONATED DYESTUFF AND PROCESS OF MAKING SAME

Hugo Siebenbürger, Basel, Switzerland, assignor to firm of Society of Chemical Industry in Basle, Basel, Switzerland No Drawing. Application November 28, 1934, Serial No. 755,233. In Switzerland December 23, 1933

4 Claims. (Cl. 260—53)

The present invention is based on the observation that the dyestuff of the anthraquinone series corresponding to the formula:

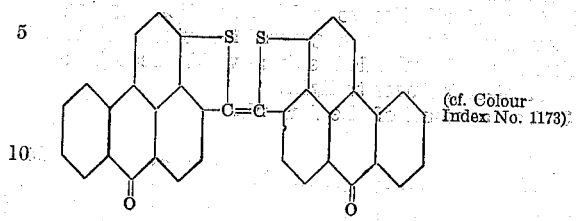

(cf. Colour Index No. 1173)

is converted into a new sulphonated dyestuff by treating it with agents having a sulphonating action, such as chlorosulphonic acid, sulphuric acid, fuming sulphuric acid, if necessary in the presence of substances having a catalytic or protective action, such as mercury sulphate, sulphur, selenium, iodine or boric acid. The new dyestuff contains probably 1 to 3 or 4 sulphogroups in the molecule, therefore it corresponds very probably to the formula

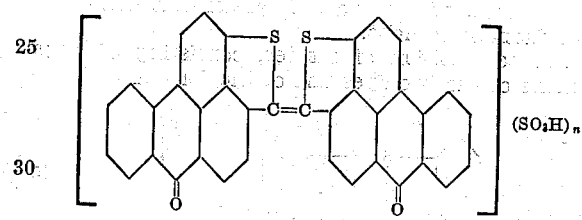

wherein $n$ stands for a whole number which is smaller than 5, and constitutes a dark powder which dissolves in water or in dilute solutions of alkalies with blue coloration. This dyestuff may find application as vat dyestuff. It dyes cotton tints similar to those of the unsulphonated dyestuff but faster to chlorine. It can also be used for dyeing artificial and natural silk in a neutral, alkaline or acid bath, the dyeings obtained from an acid bath, on unloaded silk being particularly remarkable. They possess great purity, quite an excellent fastness to light combined with a very good fastness to washing and water, and their brilliance in the artificial light is extraordinary. Finally, the dyestuff in the form of its sparingly soluble barium salts may be used as varnish dyestuff.

The following examples illustrate the invention, the parts being by weight:—

Example 1

10 parts of the dyestuff No. 1173 of the Colour Index are slowly introduced at ordinary temperature into 200 parts of chlorosulphonic acid while well stirring, only a slight increase of temperature taking place. The reaction mixture is heated to 55° C. in the course of half an hour and maintained for 3 hours at 55–60° C. When cold it is mixed with 200 parts of concentrated sulphuric acid, while cooling, and the diluted sulphonation mixture is slowly introduced into a cooled solution of concentrated common salt. There precipitates the sodium salt of the dyestuff sulphonic acid thus formed. For isolation a suction-filter is employed and the residue washed with a concentrated common salt solution until it is free from mineral acid. The residue which is green-blue of color is either worked up directly into a paste, or it is dried in a vacuum at 60°–70° C., and ground. It then constitutes a dark powder, representing a mixture of the acids of the formulas

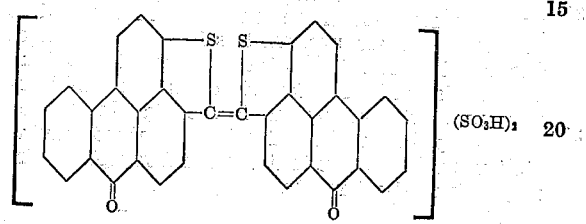

and

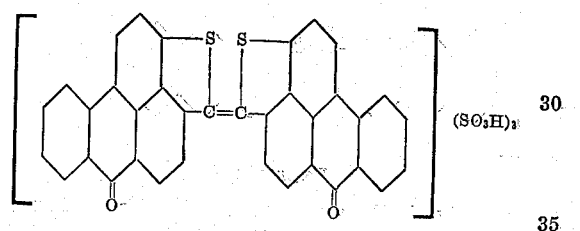

Example 2

Into 200 parts of sulphuric acid of 66° Bé there are introduced at ordinary temperature 10 parts of the dyestuff No. 1173 of the Colour Index, while stirring, the temperature of the sulfonation liquid is raised to 100° C. in the course of ½ hour and maintained at 100–105° C. during 3½ hours. When cold the reaction liquid is then directly introduced into a concentrated Glauber's salt solution and worked up as indicated in Example 1. The sulphonation can also be carried out at a lower temperature; in this case the reaction requires a longer time. Too high temperatures should, however, be avoided because they cause decomposition phenomena.

The dyestuff sulphonic acids thus obtained may be purified in such a manner that after the sulphonation is complete, so much water is allowed to flow to the cooled sulphonation mass, while stirring, that a sulphuric acid of 80 per cent. strength is formed, whereby the temperature rises to about 100° C. The black-brown crystalline sulphonate which separates on cooling is filtered by suction, washed with sulphuric acid of 80 per cent. strength, and the sodium salt of the sulphonic acid is finally precipitated by introducing the sulphonate into a concentrated solution of common salt or Glauber's salt. The isolation and working up occurs as indicated in Example 1. The dyestuff consists of a mixture of the following two products

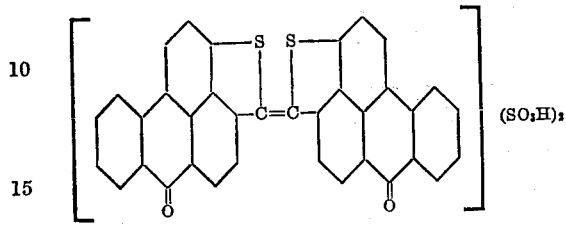

and

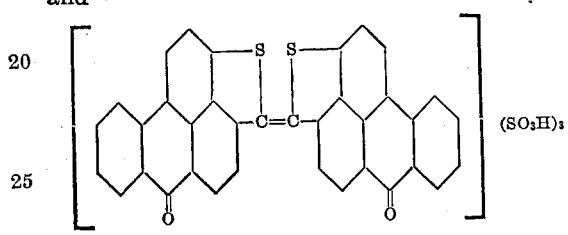

*Example 3*

Into 100 parts of fuming sulphuric acid of 12 per cent. strength there are slowly introduced at ordinary temperature, while stirring, 10 parts of the dyestuff No. 1173 of the Colour Index and stirring is continued for 24 hours at room temperature. The working up is effected as indicated in Example 1 and the dyestuff obtained having similar properties as indicated in Example 1 corresponds to the formula

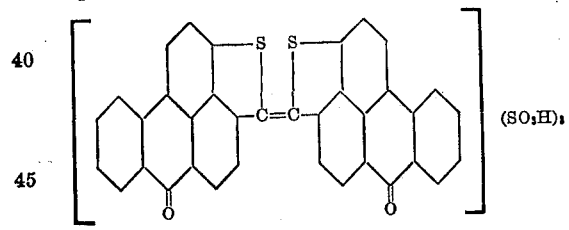

*Example 4*

The dye-bath is prepared with the necessary quantity of the dyestuff and 5 per cent. of acetic acid of 40 per cent. strength, or 4 per cent. of formic acid of 85 to 90 per cent. strength or 2 to 4 per cent. of sulphuric acid of 66° Bé. Unloaded silk is introduced at 60° C., the temperature of the bath slowly raised to 85–90° C., and dyeing continued for one hour at this temperature. The goods are then rinsed and dried.

What I claim is:—
1. The dyestuffs of the general formula

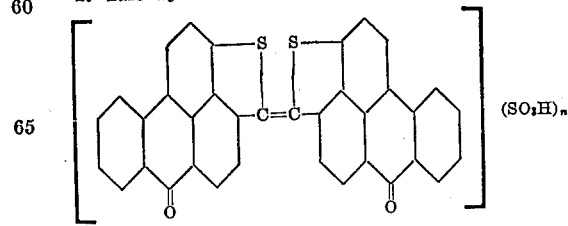

wherein $n$ stands for a whole number which is smaller than 5, which products form dark powders dissolving in dilute solutions of alkalies to blue solutions, dyeing cotton from the vat green-blue tints fast to chlorine, and unloaded silk vivid green-blue tints of high fastness to light.

2. The dyestuff of the formula

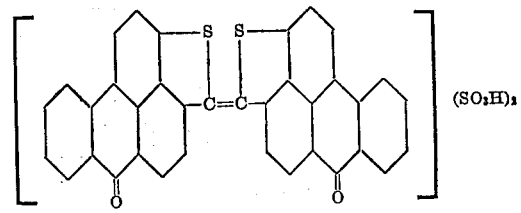

which forms a dark powder dissolving in dilute solutions of alkalies to a blue solution, dyeing cotton from the vat a green-blue tint fast to chlorine, and unloaded silk a vivid green-blue tint of high fastness to light.

3. The dyestuff of the formula

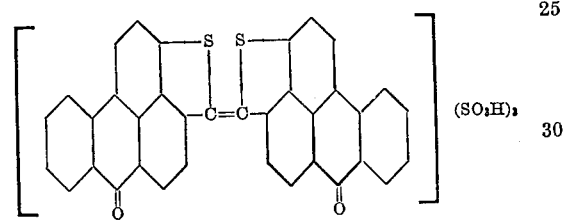

which forms a dark powder dissolving in dilute solutions of alkalies to a blue solution, dyeing cotton from the vat a green-blue tint fast to chlorine, and unloaded silk a vivid green-blue tint of high fastness to light.

4. A composition of matter, consisting of a mixture of the two dyestuffs of the formulas

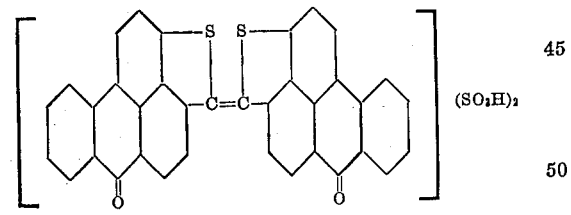

and

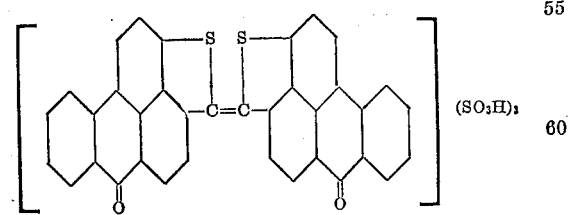

which forms a dark powder dissolving in dilute solutions of alkalies to a blue solution, dyeing cotton from the vat a green-blue tint fast to chlorine, and unloaded silk a vivid green-blue tint of high fastness to light.

HUGO SIEBENBÜRGER.